Dec. 26, 1944.  D. G. GRISWOLD  2,366,144
PRESSURE RESPONSIVE VALVE
Filed May 1, 1940  2 Sheets-Sheet 1
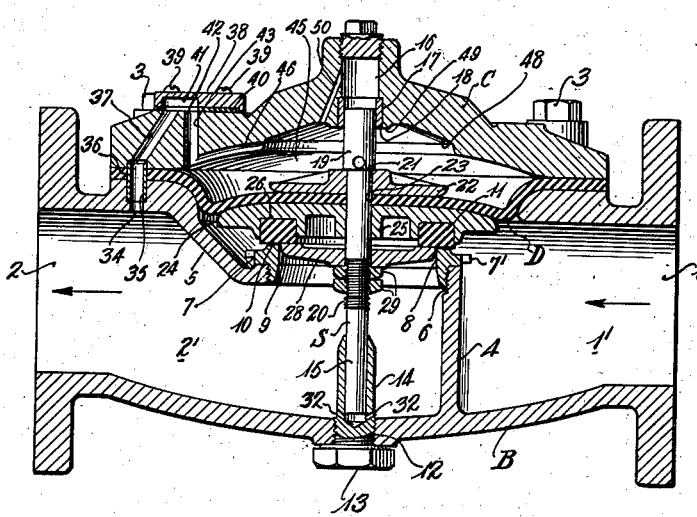
INVENTOR.
Donald G. Griswold
BY Bacon + Thomas
ATTORNEYS Dec. 26, 1944.  D. G. GRISWOLD  2,366,144
PRESSURE RESPONSIVE VALVE
Filed May 1, 1940  2 Sheets-Sheet 2

Inventor
Donald G. Griswold
By Bacon & Thomas
Attorneys

Patented Dec. 26, 1944

2,366,144

UNITED STATES PATENT OFFICE 2,366,144

PRESSURE RESPONSIVE VALVE

Donald G. Griswold, Alhambra, Calif., assignor to Clayton Manufacturing Company, Alhambra, Calif.

Application May 1, 1940, Serial No. 332,824

13 Claims. (Cl. 137—153)

The present invention relates to check valves, and more particularly to a self-governing check valve designed to operate efficiently and quietly and to open automatically whenever the pressure on the inlet side of the valve is greater than that on the outlet side of the valve and to close automatically when the pressure conditions are reversed.

One of the most common objections to known types of check valves is that they have a tendency to slam closed whenever there is an interruption of flow or change in pressure. Such valves are usually constructed so that the closing member or valve disc, whether it be hinged or movable bodily, travels in a direction opposite to that of the normal flow of fluid to effect closing of the valve. In other words, the closing member travels in the same direction as the attempted return flow of fluid and the inertia of the fluid causes the disc to slam or suddenly strike against its seat. It is this sudden seating, resulting in the sudden stopping of the moving return stream, that sets up a back surge or a knock, producing what is commonly referred to as "line shock" or "water hammer." Aside from the undesirable noise incident to hammering, there is the more serious danger of the piping bursting from sudden excess pressure, or breaking as a result of vibratory strains imposed by repeated shock. This situation commonly occurs when a conventional check valve is used at the end of a long water line. Furthermore, when such check valve is used at the discharge of a pulsating pump, the valve disc is caused to strike its seat with every pulsation of the pump, producing frequent and repeated hammer-like blows on the valve disc and seat which quickly destroy the valve.

In contrast, the check valve of the present invention is constructed so that it is impossible for the return flow to slam the valve shut and produce hammering or line shock. While in previous valves the closing member has been directly urged against its seat by any attempted return flow and the closing member has thus been caused to travel in the same direction as the return flow, the closing member of the valve of the present invention is positively moved in a direction opposite to and against such flow to effect closing of the valve. Stated differently, the closing member of the present valve actually cuts off flow by moving in the same direction as that of the fluid normally flowing through the valve. The operation of the closing member of the present check valve is independent of the back surge or return flow, and contrary to the action of other valves, it does not suddenly cut off the return flow, but does act directly thereon, closing slowly and positively at such a rate as to gradually cut off the return flow; thereby avoiding damage to the valve and the pipe line.

One important advantage of the above action is that in a pulsating line, the valve disc or closing member normally does not have sufficient time to respond to the rate of flow change and it therefore remains partially or fully open without the disc touching the seat on every pulsation of the pump, as is the case with an ordinary type of check valve. In normal operation, the present valve is either fully open or fully closed. The fact that the valve is always wide open when the flow is in the normal direction constitutes a desirable advantage, in that it reduces the resistance to the flow of liquid and, therefore, results in lower pumping costs.

Valves constructed in accordance with the present invention operate upon a pressure differential in the inlet and outlet sides of the valve. The valve disc or closing member of the valve is operated by a diaphragm which is responsive to the differences in pressure. In one form of the valve, the outlet chamber of the valve is in direct communication with the diaphragm chamber, so that corresponding pressures always exist in these two chambers. In another form of the invention, a control means is employed for controlling the rate of flow of the pressure fluid to and from the diaphragm chamber so that both the opening and closing rate of the valve may be controlled.

The primary object of the invention is to provide a check valve which will be free from the above noted objections and which will have the advantage of controlling the flow of water or other liquid without producing chattering, line shock or hammering. These objections are overcome and the advantages obtained by providing a check valve whose closing action is definitely controlled so as to preclude line shock and hammering.

One of the important objects of the invention is to provide a check valve of the diaphragm type which is automatically responsive to the pressure of the medium passing therethrough and which will close quietly against any return flow.

Another object of the invention is to provide a check valve in which both the opening and closing action may be regulated and controlled so that at least the closing action will be uniformly slow, and the opening action substantially unretarded so that the valve can be reopened to its fullest extent without undue delay.

A further object of the invention is to provide a check valve with a guided valve disc and a cooperating seat and choke-washer arranged to eliminate noise during opening and closing.

A still further object of the invention is to provide a pressure operated check valve in which the stem projects outwardly beyond the valve body to indicate whether the valve is open or shut, or in any position intermediate thereof.

Another object of the invention is to provide a check valve construction in which the period of closing and opening of the valve may be varied as desired to meet specific conditions; for example, in certain installations employing large diameter pipe lines of great length and valves of large size, a total closing period of one to two minutes or more may be necessary to cut off flow without producing line shock or hammering, whereas, it may be desirable to have the valve open substantially immediately to resume flow.

A further object of the invention is to provide a check valve which is positive in its operation and which will not waver or flutter between open and closed positions, but which in normal operation will be either completely closed or fully open; complete closing avoiding undesirable leakage through the valve, and full opening enabling the valve to operate with maximum efficiency without restricting or impeding flow therethrough.

Another object of the invention is to provide a control unit for use with a check valve for positively controlling the opening and closing time of the valve.

A still further object of the invention is to provide an automatic check valve which is comparatively simple in construction, relatively inexpensive to manufacture, and which requires no substantial servicing.

Other and further objects of the invention will be apparent from the following description, taken in connection with the accompanying drawings, in which:

Figure 1 illustrates one type of check valve in which the pressure in the outlet side of the valve is communicated through passageways in the valve to a diaphragm chamber to effect opening and closing of the valve;

Figure 2 is an enlarged fragmentary sectional view showing the details of construction of the valve seat, the valve disc and the choke-washer shown in Figure 1;

Figure 3 illustrates a modified form of stem construction which may be used in a valve of the type shown in Figure 1 to indicate the position of the valve disc relative to its seat;

Figure 5:
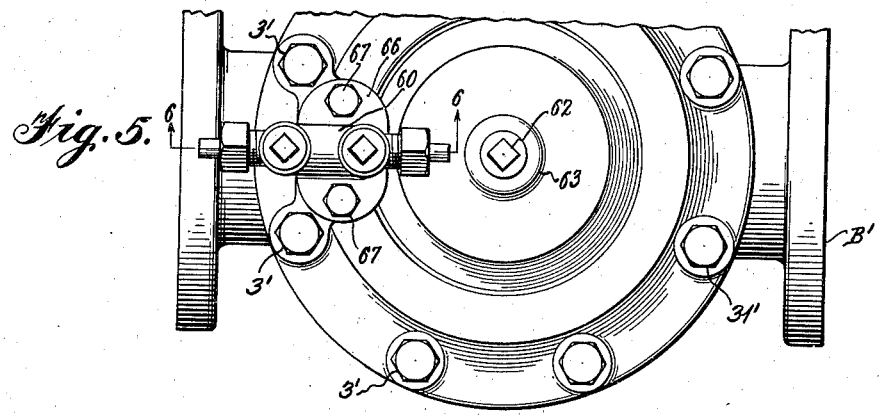
Figure 5 is a partial plan view of the valve shown in Figure 4.

Referring now to Figure 1 of the drawings, the letter B indicates the valve body and the numerals 1 and 2, respectively, indicate the inlet and outlet sides of the valve. The letter C indicates the cap of the valve and the letter D indicates a circular diaphragm whose marginal portion is clamped between the body B and the cap C by any suitable number of cap screws 3.

The body B is provided at its inlet side 1 with a substantially vertical partition wall 4 forming an inlet chamber 1' and an angular wall portion 5 cooperating with the wall 4 to form an outlet chamber 2'. The wall portions 4 and 5 are merged to provide a circular opening 6 which is threaded and adapted to receive an annular valve seat 7. The valve seat 7 is provided with a circular opening 8 which flares outwardly toward the bottom of the valve body as indicated at 9. The upper surface of the valve seat 7 adjacent the opening 8 is provided with a declining beveled portion 10 adapted to cooperate with a valve disc 11 to form a leakproof seal, as will be explained more fully hereinafter. The valve disc 7 is further provided with circumferential projections 7' adapted to be engaged by a spanner wrench for tightly securing the seat in the threaded opening 6. The valve body B has a threaded opening 12 axially aligned with the opening 8 in the valve seat 7. An elongated plug 13 is threaded into the opening 12 and comprises a tubular guide portion 14 for one end 15 of a valve stem S. The cap member C also has a recess 16 counterbored at 17 to receive a guide bushing 18 for the upper end 19 of the valve stem S. The recess 16 is located in the cap member C so that it is axially aligned with the tubular guide portion 14 and the opening 8 of the valve seat. The valve stem S has a threaded portion 20 intermediate its lower end 15 and its upper end 19. The end 15 is of slightly less diameter than the threaded portion 20 and has a snug sliding fit in the tubular guide portion 14 of the plug 13. The upper end 19 of the valve stem is enlarged to provide a shoulder at 21 and, moreover, is snugly guided in the bushing 18. Thus, the plug 13 and bushing 18 are arranged to guide the stem 16 during vertical movement.

An upper diaphragm supporting plate 22 is adapted to be received upon the stem S and to abut the shoulder 21 with the upper side thereof. The upper side of the diaphragm D is engaged with the lower side of the plate 22 and is provided with an aperture 23 through which the valve stem S extends. The lower side of the diaphragm D is adapted to engage the upper side of a lower diaphragm supporting plate 24, and the valve stem S extends through a central boss 25 in said plate. The lower supporting plate 24 is also provided with a channel 26 formed in the lower side thereof to receive the valve disc 11 previously referred to. A combined clamping member and choke-washer 28 is adapted to be mounted upon the stem S and to engage the inner marginal portion of the valve disc 11. Clamping nuts 29 are threaded upon the portion 20 of the valve stem S and serve to retain the valve stem, the diaphragm supporting plates 22 and 24, the valve disc 11 and the choke-washer 28 in assembled relation with the diaphragm D. The outer diameter of the clamping member or choke-washer 28 is preferably only slightly less than that of the opening 8 in the valve seat 7. In a 6 inch valve, for example, the maximum radial clearance may be only three or four thousandths of an inch. The peripheral surface of the choke-washer 28 is preferably rounded, as indicated at 30, and is tapered outwardly and upwardly from said rounded portion to substantially its upper outer edge as indicated at 31 (see Figure 2). The rounded and tapered peripheral portions of the choke-washer 28 serve to gradually cut off the flow through the opening 8, and the beveled portion 10 of the valve seat 7 cooperates with the valve disc 11 to reduce eddying and to form a theoretical line contact seal whereby tight, smooth and chatterless operation of the valve is obtained.

The tubular guide 14 for the lower end of the valve stem S is pierced by one or more transverse openings 32 arranged to establish communication between the outlet chamber 2' of the valve and the interior of the guide. These openings obviously provide for free and unrestricted movement of the lower portion 15 of the valve stem in the guide 14.

The valve body B, on the outlet side thereof, is provided with a passage 34 adapted to receive one end of a short section of tubing 35. The tubing 35 extends through an opening 36 in the diaphragm D and projects into a passageway 37 formed in the cap member C. A disc member 38 is mounted on the cap C by means of screws 39. The disc 38, in cooperation with the body B and the cap C, form a valve housing means. The lower face of the disc 38 is recessed to receive a suitable gasket 40, so that a fluid-tight seal is formed between the cap and said disc. A cavity 41 is formed in the disc 38 and an opening 42 of similar size is formed in the gasket 40. One end of the cavity 41 communicates with the passageway 37 and the opposite end of said cavity is in registration with a passageway 43 in the cap member C. Thus, pressure fluid may pass from the outlet side 2' of the valve to the passageway 34, tube 35, passageway 37, cavity 41, and passageway 43 to a diaphragm chamber 45 in the cap member. A groove 46 in the underside of the cap C communicates with the passageway 43 so that communication may be established between the chambers 2' and 45, even though the diaphragm D may be in engagement with the underside of the cap C.

The cap C is also provided with a cavity 48 shaped to receive the upper diaphragm supporting plate 22 when the valve is in open position. The end face of a boss 49 formed in said cavity serves as a stop engageable by said plate to limit the opening movement of the valve. A passageway 50 is arranged in said cap to establish communication between cavity 48 and the recess 16.

The inner wall of the cap C, including the cavity 48, cooperates with the diaphragm D to form the chamber 45 adapted to receive fluid under pressure for actuating said diaphragm to cause the valve stem S to move downwardly and bring the valve disc 11 into contact with the valve seat 7 and thus close the valve.

Figure 1 illustrates the check valve in its closed position. For illustrative purposes, let it be assumed that the outlet side 2 of the valve is connected with a pipe line, pipe system, or other apparatus in which it is desired to maintain a given pressure. Let it be further assumed that the pressure in the outlet chamber 2' of the valve has dropped below the desired pressure and below that in the inlet opening 1'. It will then be apparent from the foregoing description that a corresponding pressure drop will occur in the diaphragm chamber 45 through the return of fluid from said chamber through the passageway 43, cavity 41, passageway 37, tube 35, and passageway 34 to the outlet chamber 2'. This exhaust or return of fluid is facilitated by the pressure in the inlet chamber 1' acting upwardly upon the plate 24 and the lower side of the diaphragm D tending to bodily raise the valve stem S and lift the valve disc 11 from its seat to open the valve. After the valve has been opened slightly, the pressure in the inlet chamber 1' will become effective upon the choke-washer or clamping member 28 and produce a further differential pressure effective to open the valve. As the valve stem S rises, it will, of course, force the fluid from the recess 16 into the chamber 45 through the passageway 50.

With respect to closing of the valve, it will be understood that when the desired pressure has been attained in the outlet side 2 of the valve, or a static head in excess of the inlet pressure exists on the outlet side of the valve, pressure will have been built up correspondingly in the diaphragm chamber 45 by virtue of the fact that fluid under pressure passes from the outlet chamber 2' through the passageways 34, etc. previously enumerated.

During both the opening and closing of the valve, the valve disc 11 is guided by the stem S so that it uniformly disengages and contacts the face of the seat 7. The guiding of the valve disc 11 is important, especially during closing, because if the valve disc is not constrained it will seat upon one side first, and a squeal or a noise comparable to "razzing" will result as it finally seats on the other side and cuts off the flow. Moreover, closing the valve against flow of the return stream instead of in a direction with such flow, eliminates slam and the hammering incident to sudden checking of the return flow. The choke-washer 28 also contributes to quiet operation of the valve in that it cooperates with the opening 8 in the valve seat to gradually restrict the flow and substantially cut it off before seating of the valve disc 11 occurs, thereby eliminating any tendency of the valve disc to flutter.

Thus, it will be apparent that a very simple type of check valve has been provided which is automatic in its operation and which is so constructed as to eliminate sudden closing of the valve with its accompanying hammering and line shock.

Referring now to Figure 3 of the drawings, a modified form of stem construction is shown that may be included in a valve of the type shown in Figure 1. As illustrated, a stem S' is arranged so that its lower end 15' projects outwardly beyond the body B' of the valve through a plug 13'. The stem S' is maintained in leak-proof relation with the plug 13' by a stuffing box comprising packing material 52 received in a cavity 53 in the plug 13' and a gland nut 54 threadedly received in said plug and adapted to compress the packing 52 to the extent necessarily to prevent leakage.

An indicator plate 56 is secured to the plug 13' by a screw 57. The lower end 58 of the indicator plate overlies the lower extremity of the valve stem S'. The portion 58 of the indicator plate bears suitable indicia to indicate the extent of opening of the valve. The indicia is arranged so as to cooperate with the extremity of the valve stem S', to the end that the position of the valve disc 11 relative to its seat may be apparent at all times.

The valve stem arrangement of Figure 3, in addition to indicating the extent of opening of the valve, serves the further purpose of providing a differential pressure through the action of the fluid in the recess 16 upon the upper end of the stem. This construction permits the pressure in the diaphragm chamber 45 to act directly upon the stem to move the valve to closed position, the stem, in effect, being moved as a piston.

Figure 4:
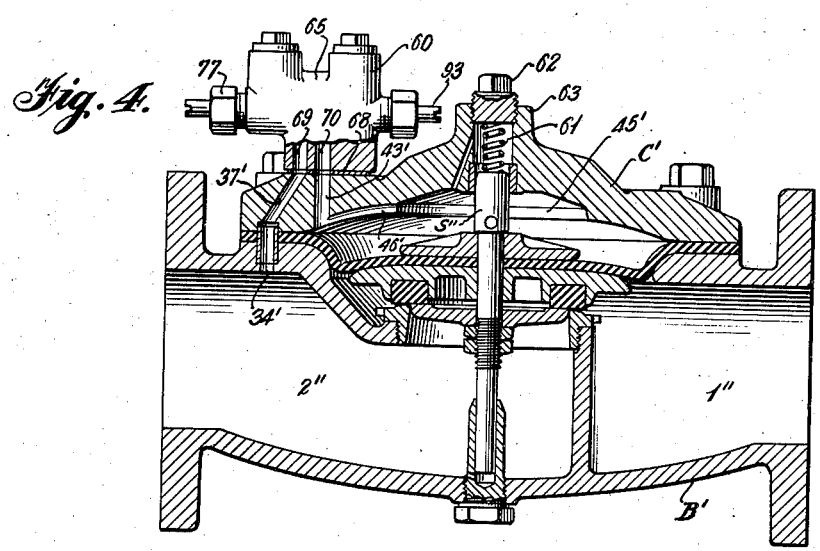
Figure 4 illustrates a further modification of the valve shown in Figure 1 in which means is provided for regulating the rate of opening and closing of the valve.

The valve shown in Figure 4 is substantially similar to that shown in Figure 1, except that it is provided with a control unit 60 in lieu of a disc 38 for controlling the opening and closing actions of the valve, respectively. The valve of Figure 4 further differs from the valve of Figure 1 in that a spring 61 is interpositioned between the upper end of a stem S'' and a plug 62 threaded into a boss 63 formed upon a cap member C'. The spring 61 may be desirable in some instances to provide an auxiliary differential pressure effective upon the upper end of the stem S'' to assist in closing the valve, although it will also be effective to oppose the opening of the valve to some extent. However, more important than these is the function of the spring 61 to offset any possible upward force resulting from the "buckling" effect of the diaphragm which might require a substantial excess of pressure in the diaphragm chamber 45' above that in the inlet chamber 1'' to initiate the downward movement of the diaphragm. Another important function of the spring 61 is to supplement the closing pressure in the diaphragm chamber 45' by providing an ever-present potential pressure sufficient to overcome the slightly increased resistance to closing as the choke member 28 and the valve disc 11 are urged against the fluid flowing through the valve seat opening 8, to effect the final closing of the valve. The spring 61 is also helpful in the event that the pipe line becomes in such condition that the difference in pressure in the inlet and outlet of the valve is so slight that, if the valve were to remain open, a back flow would occur. In such case, the spring will provide the pressure differential necessary to initiate the closing movement of the valve so that no substantial back flow can occur.

The pressure fluid from the outlet chamber 2'' of the valve shown in Figure 4 may be transmitted to the diaphragm chamber 45' through passageways 34', 37', 43' and 46' similar to the corresponding passageways in the valve of Figure 1. However, before the fluid can enter the diaphragm chamber 45' it must pass through the control unit 60.

The control unit 60 comprises a body portion 65 and a base portion 66 which is mounted upon the cap C' by cap screws 67. The cap itself is mounted upon the body B' by a series of cap screws 3'. A gasket 68 having openings aligned with the passageways 37' and 43' is clamped between the cap C' and the base 66 in leak-proof relation.

Figure 6:
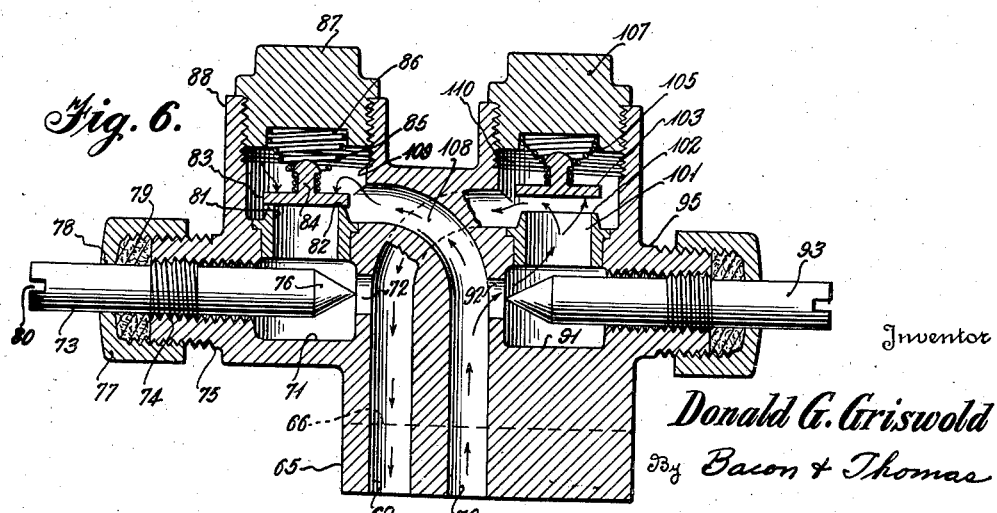
Figure 6 is a sectional view taken on the line 6—6 of Figure 5 through the valve control means.

The structural details of the control unit are best illustrated in Figure 6. Here, the body 65 is shown provided with passageways 69 and 70 adapted to be placed in alignment with the openings in the gasket 68 and the passageways 37' and 43' in the cap C'. The passageway 69 communicates with a chamber 71 through a port 72. A needle valve 73 is threadedly mounted as indicated at 74 in a boss 75 projecting from the body 65. The needle valve 73 has a tapered end 76 adapted to be moved relatively to the port 72 to regulate the flow of fluid through said port. A hollow nut 77 is threadedly mounted on the boss 75 and one end of the needle valve 73 projects through an opening 78 in said nut. A body of packing 79 within said nut is adapted to be compressed to prevent leakage through said nut. The end of the needle valve 73 may be provided with a slot 80 to facilitate adjustment thereof.

A bushing 81 is mounted at the upper end of the chamber 71 and its upper edge 82 is adapted to form a seat for a check valve disc 83. A stem 84 extends upwardly from the disc 83 and one end of a spring 85 is connected thereto. The opposite end of said spring is received in a recess 86 formed in the base of a plug 87 threadedly mounted in a boss 88 projecting upwardly from the body 65. The construction of the check valve disc 83 and spring 85 is such that said disc is permitted to leave its seat 82 when occasion requires, but is constrained from becoming misaligned with said seat by said spring.

The passageway 70 communicates with a chamber 91 through a port 92. A needle valve 93 similar to the needle valve 73 is adjustably mounted in a boss 95 to control the flow of fluid through the port 92.

A bushing 101 is mounted at the top of the chamber 91 and its upper edge forms a seat 102 for a disc-type check valve 103 similar to the check valve 83. A spring 105 is connected to the disc check valve 103 and is associated with a plug 107 in a manner similar to the spring 85.

It will be observed from Figure 6 that the passageways 69 and 70 overlap, as indicated at 108, the passageway 70 communicating with a chamber 109 in which the check valve 83 is mounted. The passageway 69 communicates with a chamber 110 in which the check valve 103 is mounted.

The arrows in the various passageways of the control unit shown in Figure 6 indicate the direction of flow of the fluid when the main valve is opening. Thus, it will be apparent that, when the valve stem S'' is rising, fluid will be expelled from the diaphragm chamber 45' and will flow through passageway 43' into the passageway 70 of the control unit. From here, the fluid will pass through the port 92 at a rate permitted by the needle valve 93. The pressure of this fluid will lift the check valve 103 from its seat and permit the fluid to flow into the chamber 110, from whence it will flow into the passageway 69 and then drain back into the outlet chamber 2'' through the passageways 37' and 34'. It will be observed that, while the fluid from the passageway 70 raises the check valve 103 from its seat against the pressure of spring 105, the pressure of this fluid transmitted to the chamber 109 acts upon the check valve 83 to maintain it tightly against its seat.

During the closing of the valve, the operation will be the reverse. That is to say, fluid will flow from the outlet chamber 2'' through the passageways 34' and 37' into the passageway 69 of the control unit. The fluid will then flow through the port 72 at the rate permitted by the needle valve 73 and will raise the check valve 83 from its seat against the pressure of the spring 85. Simultaneously, fluid from the passageway 69 will act downwardly upon the check valve 103 and maintain it upon its seat.

It will be apparent from the foregoing that adjustment of the needle valve 93 will control the rate of opening of the main check valve and that the adjustment of the needle valve 73 will control the rate of closing of the main check valve. The rate of closing and the rate of opening may thus be independently adjusted to provide, for example, a valve operation in which the main valve will close gradually and at a very slow rate to slowly cut off the flow of fluid through the valve, and the opening of the valve may be controlled so that it will occur at a relatively faster rate. As a further variation, of course, the opening and closing of the valve may be timed to occur at the same rate. In any event, the operation of the valve will be automatic, once the needle valves 73 and 93 have been set.

When the needle valve 73 is adjusted to provide for slow closing of the valve, the valve will close gradually against any attempted back flow through the main valve and thus eliminate noisy operation and any possibility of the valve slamming shut. The control unit 60 thus provides for a uniform rate of closing as well as a uniform rate of opening of the main valve.

It will be understood that the principles of the invention may be embodied in valves different from that illustrated herein without departing from the spirit of the invention and the scope of the appended claims.

I claim:

1. A pressure responsive check valve comprising: an inlet chamber, an outlet chamber, and a valve seat between said chambers; valve means cooperable with said valve seat for controlling the flow of fluid between said chambers; a diaphragm connected with said valve means for actuating the same; a pressure chamber above said diaphragm, the lower side of said diaphragm in the zone thereof outwardly of said valve seat being at all times subject to the pressure in said inlet chamber; a passageway having one end communicating with said outlet chamber; a second passageway having one end communicating with said pressure chamber; and means in communication with and interconnecting the opposite ends of said passageways including passage means and means adjustable to a fixed position relative to said passage means to control the supply of pressure fluid from said outlet chamber to said pressure chamber at substantially a desired rate, whereby said valve means will be positively moved from an open to a closed position at substantially a corresponding desired rate.

2. A pressure responsive check valve comprising: an inlet chamber, an outlet chamber, and a valve seat between said chambers; valve means cooperable with said valve seat for controlling the flow of fluid between said chambers; a diaphragm connected with said valve means for actuating the same; a pressure chamber above said diaphragm, the lower side of said diaphragm in the zone thereof outwardly of said valve seat being at all times subject to the pressure in said inlet chamber; a passageway having one end communicating with said outlet chamber; a second passageway having one end communicating with said pressure chamber; and control means including a passage means for interconnecting the opposite ends of said passageways and means adjustable to a fixed position relative to said passage means to control the exhaust of spent pressure fluid from said pressure chamber into said outlet chamber at substantially a desired rate, whereby said valve means will move from a closed position to an open position at substantially a corresponding desired rate.

3. A check valve of the diaphragm type comprising: housing means having an inlet chamber, an outlet chamber, and a valve seat intermediate said chambers; a valve disc adapted to engage said valve seat; a valve stem connected with said valve disc; a hollow tubular member threaded into said housing means below said valve seat and extending a substantial distance into said outlet chamber for guiding the lower end of said valve stem, said hollow tubular member being provided with a vent opening at a point adjacent the bottom of said outlet chamber, whereby to establish communication between said outlet chamber and the interior of said hollow tubular member; a spring in said housing means normally urging said valve stem downwardly; a diaphragm in said housing means operably connected with said valve stem; a pressure chamber above said diaphragm; and intercommunicating passageways in said housing means arranged to at all times establish communication between said outlet chamber and said pressure chamber.

4. A pressure responsive valve comprising: a body; a cap member; a diaphragm between said body and cap member, said body having an inlet chamber, an outlet chamber, and a valve seat intermediate said chambers; a valve disc adapted to engage said valve seat; a valve stem connected with said diaphragm and said valve disc; guide means in said cap member and body, respectively, for the opposite ends of said valve stem, the guide means in said body including a removable plug having a reduced cylindrical portion extending a substantial distance into said outlet chamber; a spring normally urging said valve stem downwardly; a pressure chamber in said cap member above said diaphragm; and means including passageways in said body and cap member at all times establishing communication between said outlet chamber and said pressure chamber.

5. A pressure responsive valve comprising: a body; a cap member; a diaphragm between said body and cap member, said body having an inlet chamber, an outlet chamber, and a valve seat intermediate said chambers; a valve disc adapted to engage said valve seat; a valve stem connected with said diaphragm and said valve disc; guide means in said cap member and body, respectively, for the opposite ends of said valve stem, the guide means in said body including a removable plug having an elongated cylindrical portion extending a substantial distance into said outlet chamber; a spring in said cap member engaging the upper end of said valve stem and normally urging said valve stem downwardly; a pressure chamber in said cap member above said diaphragm, the lower side of said diaphragm in the zone thereof outwardly of said valve seat being at all times subject to the pressure in said inlet chamber; passageways in said body and cap member for establishing communication between said outlet chamber and said pressure chamber; and means operatively interconnecting said passageways for establishing intercommunication between said outlet and pressure chambers at all times.

6. A pressure responsive valve comprising a body; a cap member; a diaphragm between said body and cap member, said body having an inlet chamber and an outlet chamber, and a valve seat intermediate said chambers; a valve disc adapted to engage said valve seat; a valve stem connected with said diaphragm and said valve disc; guide means in said body for said valve stem; a pressure chamber in said cap member above said diaphragm; passageways in said body and cap member for establishing communication between said outlet chamber and said pressure chamber; a unit mounted upon said cap member cooperable with said passageways for controlling the rate of flow of operating fluid between said outlet chamber and said pressure chamber, said unit including a housing having a pair of passageways formed therein and arranged to be interconnected within said housing; means in said housing for establishing communication between the passageways in said housing to establish flow of fluid in one direction therethrough from said outlet chamber to said pressure chamber at one rate; and other means in said housing for establishing communication between said housing passageways for controlling flow in the opposite direction from said pressure chamber to said outlet chamber at a different rate.

7. A pressure-responsive valve comprising a main valve body; a cap member; a diaphragm between said body and cap member, said body having an inlet chamber and an outlet chamber, and a valve seat intermediate said chambers; a valve disc adapted to engage said valve seat; a valve stem connected with said diaphragm and said valve disc; guide means in said body for said valve stem; a pressure chamber in said cap member above said diaphragm; passageways in said body and cap member for establishing communication between said outlet chamber and said pressure chamber; and a unit mounted upon said cap member for controlling the rate of flow of operating fluid between said outlet chamber and said pressure chamber, said unit including a housing having a pair of passageways formed therein and communicating with said passageways in said body and cap member to alternately admit fluid into and discharge fluid from said housing, a separate port in said housing opening into each of the passageways in said housing, separate needle valves for controlling the rate of flow from said housing passageways into their respective ports, and a pair of check valves in said housing operatively associated with said ports and housing passageways, one of said check valves being arranged to open and allow the flow of operating fluid under pressure from the outlet chamber of said main valve and through the port of one passageway of said housing into the other passageway of said housing and thence into said pressure chamber, and the other of said check valves being arranged to subsequently open and allow the flow of spent pressure fluid from said pressure chamber and through the port of said other passageway of said housing into said first-mentioned passageway of said housing and thence to said outlet chamber, whereby to automatically and respectively control the opening and closing of said main valve at a desired predetermined rate.

8. A check valve responsive to differential pressure in the inlet and outlet chambers thereof comprising: a valve body; a cover including a substantially flat external face portion; a diaphragm disposed between said valve body and cover, said valve body having an inlet chamber, an outlet chamber, and a valve seat between said chambers, said cover having a cavity providing a pressure chamber for operating fluid above said diaphragm; a valve stem connected with said diaphragm and movable axially of said valve seat, said body having a passage extending therethrough communicating at its lower end with said outlet chamber and said cover having two passageways extending therethrough with their upper ends terminating in spaced relation in said face portion, one of said passageways registering at its lower end with the upper end of said passage in said valve body and the other of said passageways opening at its lower end into said diaphragm pressure chamber; and an element detachably mounted upon said cover in sealing relation with said face portion provided with passage means registering with and interconnecting the upper spaced ends of said two passageways of said cover.

9. A check valve responsive to differential pressure in the inlet and outlet chambers thereof comprising: a valve body; a cover; a diaphragm disposed between said valve body and cover, said valve body having an inlet chamber, an outlet chamber, and a valve seat between said chambers, said cover having a cavity providing a pressure chamber for operating fluid above said diaphragm; a valve stem connected with said diaphragm and movable axially of said valve seat, said body having a passage extending therethrough communicating at its lower end with said outlet chamber and said cover having two passageways extending therethrough, one of said passageways communicating at its lower end with the upper end of said passage in said valve body and the other of said passageways opening at its lower end into said pressure chamber; an element mounted upon said cover provided with passage means registering with and interconnecting the upper ends of said two passageways of said cover; and means carried by said element for adjusting the rate of flow through said passage means.

10. A valve comprising, a cover member; a body, said body having an inlet chamber and an outlet chamber, and a valve seat intermediate said chambers; pressure operable means cooperable with said valve seat for controlling the flow therethrough, said cover member having a pressure chamber for operating fluid for actuating said pressure operable means; passageways in said body and cover member for establishing communication between said outlet chamber and said pressure chamber; a unit mounted upon said cap member cooperable with said passageways for controlling the rate of flow of operating fluid between said outlet chamber and said pressure chamber, said unit including a housing having a pair of passageways formed therein and arranged to be interconnected within said housing; means in said housing for establishing communication between the passageways in said housing to establish flow of fluid in one direction therethrough from said outlet chamber to said pressure chamber; and other means in said housing for establishing communication between said housing passageways for controlling the flow in the opposite direction from said pressure chamber to said outlet chamber.

11. A valve responsive to differential pressure in the inlet and outlet chambers thereof comprising: a valve body; a cover for said valve body including a substantially flat external face portion, said valve body having an inlet chamber, an outlet chamber, and a valve seat between said chambers; fluid pressure operable means cooperable with said valve seat for controlling the flow therethrough, said cover member having a chamber to receive operating fluid for affecting the actuating of said fluid pressure operable means, said body having a passageway extending therethrough communicating at its lower end with said outlet chamber and said cover member having two passageways extending therethrough with their upper ends terminating in spaced relation in said face portion, one of said passageways registering at its lower end with the upper end of said passage in said valve body and the other of said passageways opening at its lower end into said pressure chamber; and an element detachably mounted upon said cover in sealing relation with said face portion provided with passage means registering with and interconnecting the upper spaced ends of said two passageways of said cover member.

12. A pressure responsive check valve comprising: an inlet chamber, an outlet chamber, and a valve seat between said chambers; valve means cooperable with said valve seat for controlling the flow of liquid between said chambers; a diaphragm connected with said valve means for actuating the same; a pressure chamber above said diaphragm; a passageway having one end communicating with said outlet chamber; a second passageway having one end communicating with said pressure chamber; and control means including a passage means for interconnecting the opposite ends of said passageways arranged to provide for the supply of pressure fluid from said outlet chamber to said pressure chamber, said control means including a further passage means arranged to provide for the exhaust of spent pressure fluid from said pressure chamber into said outlet chamber, said control means being provided with independently adjustable means operatively associated with each of said passage means for admitting fluid to and exhausting fluid from said pressure chamber so that the valve may be adjusted to close at a slow rate and to open at a relatively faster rate.

13. A valve responsive to the differential pressure in the inlet and outlet chambers thereof comprising: a body having an inlet chamber, an outlet chamber, and a valve disk controlling the flow between said chambers; a cap member having a substantially flat external face portion; a diaphragm between and engaged by said body and cap member, said diaphragm cooperating with said cap member to provide a pressure chamber for operating fluids; means connecting said diaphragm with said valve disk; an element detachably mounted upon said face portion of said cap member; and adjoining, unobstructed passageways in said body and cap member having adjacent ends terminating in said face portion and respectively communicating with said outlet chamber and said pressure chamber at their other ends, said element being arranged and constructed to establish communication between said adjacent ends of said passageways.

DONALD G. GRISWOLD.